United States Patent
Wang et al.

(10) Patent No.: US 10,815,332 B2
(45) Date of Patent: Oct. 27, 2020

(54) PBS RESIN COMPOSITION AND PREPARATION METHOD THEREOF

(71) Applicant: Kingfa Sci. & Tech. Co., Ltd., Guangzhou, Guangdong (CN)

(72) Inventors: Weiwei Wang, Guangzhou (CN);
Zhimin Yuan, Guangzhou (CN);
Tongmin Cai, Guangzhou (CN);
Xianbo Huang, Guangzhou (CN);
Xiangbin Zeng, Guangzhou (CN);
Renxu Yuan, Guangzhou (CN);
Zhilong Guo, Guangzhou (CN);
Meijun Tang, Guangzhou (CN)

(73) Assignee: Kingfa Sci. & Tech. Co., Ltd. (CN)

( * ) Notice: Subject to any disclaimer, the term of this patent is extended or adjusted under 35 U.S.C. 154(b) by 61 days.

(21) Appl. No.: 16/317,648

(22) PCT Filed: Nov. 30, 2017

(86) PCT No.: PCT/CN2017/113750
§ 371 (c)(1),
(2) Date: Jan. 14, 2019

(87) PCT Pub. No.: WO2018/113496
PCT Pub. Date: Jun. 28, 2018

(65) Prior Publication Data
US 2019/0292314 A1   Sep. 26, 2019

(30) Foreign Application Priority Data
Dec. 20, 2016 (CN) .......................... 2016 1 1182854

(51) Int. Cl.
*C08G 63/16* (2006.01)
*C08G 63/78* (2006.01)
*C08K 5/521* (2006.01)
*C08K 5/56* (2006.01)
*C08K 5/10* (2006.01)

(52) U.S. Cl.
CPC ............. *C08G 63/16* (2013.01); *C08G 63/78* (2013.01); *C08K 5/10* (2013.01); *C08K 5/521* (2013.01); *C08K 5/56* (2013.01)

(58) Field of Classification Search
CPC ...... C08G 63/16; C08G 63/78; C08K 5/5212; C08K 5/56

USPC ......................................................... 524/140
See application file for complete search history.

(56) References Cited

U.S. PATENT DOCUMENTS

| 2011/0162205 A1* | 7/2011 | Kong | C01G 23/00 |
| | | | 29/890 |
| 2011/0220203 A1 | 9/2011 | Takegami | |
| 2014/0288261 A1* | 9/2014 | Kang | C08G 63/78 |
| | | | 528/279 |
| 2016/0326305 A1* | 11/2016 | Ryum | C08G 63/78 |

FOREIGN PATENT DOCUMENTS

| CN | 102190868 A | 9/2011 |
| CN | 103974994 A | 8/2014 |
| CN | 105061744 A | 11/2015 |
| CN | 105131269 A | 12/2015 |
| CN | 106832235 A | 6/2017 |
| EP | 1106640 A2 | 6/2001 |
| EP | 3091046 A1 | 11/2016 |
| JP | 2006274253 A | 10/2006 |

OTHER PUBLICATIONS

Search report from International Application No. PCT/CN2017/113750, dated Mar. 6, 2018.

* cited by examiner

*Primary Examiner* — Hui H Chin

(74) *Attorney, Agent, or Firm* — Lerner, David, Littenberg, Krumholz & Mentlik, LLP

(57) ABSTRACT

The present invention discloses a PBS resin composition and a preparation method thereof. The composition comprises: a. PBS resin; b. element titanium; c. element phosphorus, wherein a weight ratio range of titanium to phosphorus is 0.6-10:1, preferably 0.7-4:1, and more preferably 1.25-1.5:1. A weight content of the element titanium is 20-200 ppm, and a weight content of the element phosphorus is 15-70 ppm. By adding a titanium-containing compound and a phosphorus-containing compound and controlling the range of the weight ratio of the element titanium to the element phosphorus in the PBS resin composition to be 0.6-10:1, the present invention obtains a PBS resin composition. After treating in a 95° C.-distilled water bath for 12 hours and drying at 90° C. for 3 hours, a change of the melt flow index of the PBS resin composition is less than 50.0 g/10 min, and the PBS resin composition possesses an obviously improved hydrolysis property.

15 Claims, No Drawings

PBS RESIN COMPOSITION AND PREPARATION METHOD THEREOF

CROSS REFERENCE TO RELATED APPLICATIONS

The present application is a national phase entry under 35 U.S.C. § 371 of International Application No. PCT/CN2017/113750, filed Nov. 30, 2017, which claims priority from Chinese Patent Application No. 201611182854.1 filed Dec. 20, 2016, all of which are hereby incorporated herein by reference.

TECHNICAL FIELD

The present invention belongs to the field of modification of macromolecular materials, and specifically relates to a PBS resin composition with good hydrolysis property.

BACKGROUND

PBS (poly(1,4-butylene succinate)) resin, being a biodegradable resin, can be completely degraded to water and carbon dioxide, thereby reducing plastic garbage, and it possesses an extensive application prospect in fields such as supermarket shopping bag, domestic garbage bag, agricultural plastic mulching film and packaging film. Although commercially available PBS resin satisfies the requirements of environment protection and biodegradation, the speed of hydrolysis of the PBS resin is too fast for long-term storage. Generally, the PBS resin has already started to be hydrolyzed before fully used, and thus severely influencing the application of PBS in various fields. Therefore, how to provide a PBS resin with good hydrolysis property has become a problem demanding prompt solution.

SUMMARY OF THE INVENTION

The objective of the present invention is to provide a PBS resin composition with good hydrolysis property.

Another objective of the present invention is to provide a preparation method of the above-described PBS resin composition.

In order to achieve the above objectives, following technical solutions are used.

A PBS resin composition, comprising following components:
 (a) PBS resin
 (b) element titanium
 (c) element phosphorus,
wherein a range of a weight ratio of the element titanium to the element phosphorus is 0.6-10:1, the element titanium is from a titanium-containing compound and the element phosphorus is from a phosphorus-containing compound.

Particularly, the range of the weight ratio of the element titanium to the element phosphorus in the PBS resin composition is preferably 0.7-4:1, and more preferably 1.25-1.5:1. In the PBS resin composition, a weight content of the element titanium is preferably 20-200 ppm, and a weight content of the element phosphorus is 15-70 ppm.

The element titanium exhibits a catalysis effect on the proceeding of a reaction. A too low addition amount of the element titanium leads to low proceeding of a polymerization reaction, and a too high addition amount of the element titanium leads to easy degradation of the PBS resin. The element phosphorus can improve the color of a product, but there's a certain complexation between the element phosphorus and the titanium-containing compound. A too high addition amount of the element phosphorus leads to a reducing activity of a catalyst, slowing down a polymerization speed and increasing the possibility of thermal degradation of the resin during the polymerization; while a too low addition amount of the element phosphorus cannot effectively improve the color of the product. It is found by a great deal of experiments that when the weight ratio of the element phosphorus to the element titanium in the PBS resin composition is 0.6-10:1, the hydrolysis property of the PBS resin can be improved, and meanwhile the color of the PBS resin product also meets the requirement.

In the present invention, by controlling the addition amounts of the titanium-containing compound and the phosphorus-containing compound during the synthetic process of the PBS resin composition, the weight ratio of the element titanium to the element phosphorus in the PBS resin composition is adjusted.

With reference to the US EPA method 3052:1996 by using ICP-OES for analysis, the weight contents of the element titanium and the element phosphorus in the PBS resin composition of the present invention are determined according to the following procedure: weighing 0.1 g of the PBS resin composition and crushing, then dropping 5 mL of nitric acid to fully immerse the PBS resin composition; then dropping 1.0 mL of hydrogen peroxide to react for 2 minutes, sealing into a microwave digestion tank to digest at 210° C. for 3 hours; and after cooling to room temperature, filtering with a 0.45 μm filter membrane followed by diluting with distilled water to a volume of 50 mL for an ICP-OES test.

The PBS resin composition of the present invention has a melt flow index of 3.0-10.0 g/10 min when tested at 190° C. under a condition of 2.16 kg weight.

Said element phosphorus of the present invention is selected from one of or a mixture of more of triethyl phosphate, trimethyl phosphate, tributyl phosphate and triphenyl phosphate.

Said element titanium of the present invention is selected from one of or a mixture of N-butyl titanate and isopropyl titanate.

After treating in a 95° C.-distilled water bath for 12 hours and drying at 90° C. for 3 hours, a change of the melt flow index of the PBS resin composition in the present invention is less than 50.0 g/10 min.

A preparation method of the PBS resin composition comprises the following steps:
(1) mixing succinic acid, 1,4-butanediol and a titanium-containing compound, and maintaining at a temperature of 180-250° C. under a pressure of 50-100 kPa for 1-5 hours;
(2) after aerating $CO_2$, adding a phosphorus-containing compound and maintaining for 10-30 minutes; and
(3) reducing the pressure to less than 100 Pa, heating a mixture obtained in step (2) to 230-250° C., maintaining for 3-6 hours, aerating nitrogen and pelletizing.

Compared with the prior art, the present invention has following advantages:

In the present invention, by controlling the range of the weight ratio of the element titanium to the element phosphorus in the PBS resin composition to be 0.6-10:1, and after treating in a 95° C.-distilled water bath for 12 hours and drying at 90° C. for 3 hours, a change of the melt flow index of the above-described PBS resin composition is less than 50.0 g/10 min. The PBS resin composition of the present invention has an apparently improved hydrolysis property.

DESCRIPTION OF THE PREFERRED EMBODIMENTS

The present invention is further described by specific implementations. The following embodiments are preferred implementations of the present invention, but the implementation of the present invention is not limited to the following embodiments.

Following raw materials are used in the present invention, but the present invention is not limited to these raw materials:

succinic acid: purity≥99.9, Shandong Jinyu Chemical Co., Ltd.
1,4-butanediol: purity≥99.5, Shanxi Sanwei Group
N-butyl titanate: purity≥99.0, Tianjin Kemiou Chemical Reagent Co., Ltd.
isopropyl titanate: purity≥95.0, Aladdin Reagent
triphenyl phosphate: purity≥98.0, Aladdin Reagent
trimethyl phosphate: purity≥99.0, Aladdin Reagent
triethyl phosphate: purity≥99.5, Aladdin Reagent.

Embodiments 1-13: Preparation of PBS Resin Composition

Succinic acid, 1,4-butanediol and a titanium-containing compound were mixed according to the formulas in Table 1, and maintained at a temperature of 180-250° C. under a pressure of 50-100 kPa for 1-5 hours; after $CO_2$ was aerated, a phosphorus-containing compound was added and maintained for 10-30 minutes; the pressure was reduced to less than 100 Pa, the mixture was heated to 230-250° C. and maintained for 3-6 hours, nitrogen was aerated, and the PBS resin composition was obtained by pelletizing. By controlling addition amounts of the titanium-containing compound and the phosphorus-containing compound, a weight ratio of element titanium to element phosphorus in the PBS resin composition can be adjusted.

Property Test Methods:

With reference to the US EPA method 3052:1996 by using ICP-OES for analysis, weight contents of the element titanium and the element phosphorus in the PBS resin composition of the present invention are determined according to the following procedure: 0.1 g of the PBS resin composition is weighed and crushed, then 5 mL of nitric acid is dropped to fully immerse the PBS resin composition; then 1.0 mL of hydrogen peroxide is dropped to react for 2 minutes, and the mixture is sealed into a microwave digestion tank to digest at 210° C. for 3 hours; and after cooling to room temperature, the mixture is filtered with a 0.45 μm filter membrane followed by diluting with distilled water to a volume of 50 mL for an ICP-OES test.

Melt flow index: testing at 190° C. under a condition of 2.16 kg weight. First, a melt flow index of a product of the embodiments or comparative embodiments is tested for the first time. The above-described product is treated in a 95° C.-distilled water bath for 12 hours and dried at 90° C. for 3 hours. Then, a melt flow index of the PBS resin composition is tested again. A change value of the melt flow index is obtained by subtracting the melt flow index which is after the PBS resin composition subjected to the water bath from the melt flow index which is before the PBS resin composition subjected to the water bath.

TABLE 1

Masses (g) of raw materials used in preparing the PBS resin compositions in Embodiments 1-13 and Comparative Examples 1-2

| component | succinic acid | 1,4-butanediol | N-butyl titanate | isopropyl titanate | triphenyl phosphate | trimethyl phosphate | triethyl phosphate |
|---|---|---|---|---|---|---|---|
| Embodiment 1 | 4114.4 | 4709.9 | | 1.781 | 2.526 | | |
| Embodiment 2 | 4114.4 | 4709.9 | 0.853 | | | | 0.529 |
| Embodiment 3 | 4114.4 | 4709.9 | | 1.069 | 1.263 | | |
| Embodiment 4 | 4114.4 | 4709.9 | 1.493 | | 3.158 | | |
| Embodiment 5 | 4114.4 | 4709.9 | 2.986 | | | | 2.114 |
| Embodiment 6 | 4114.4 | 4709.9 | | 3.207 | | 1.491 | |
| Embodiment 7 | 4114.4 | 4709.9 | 5.119 | | | 1.898 | |
| Embodiment 8 | 4114.4 | 4709.9 | | 2.850 | | 0.949 | |
| Embodiment 9 | 4114.4 | 4709.9 | 4.266 | | 1.579 | | |
| Embodiment 10 | 4114.4 | 4709.9 | 1.331 | | 3.379 | | |
| Embodiment 11 | 4114.4 | 4709.9 | | 1.425 | | | 2.113 |
| Embodiment 12 | 4114.4 | 4709.9 | | 5.345 | | | 0.775 |
| Embodiment 13 | 4114.4 | 4709.9 | 8.532 | | 1.263 | | |
| Comparative Example 1 | 4114.4 | 4709.9 | 0.853 | | | 1.356 | |
| Comparative Example 2 | 4114.4 | 4709.9 | 7.767 | | 0.947 | | |

| | Embodiment 10 | Embodiment 11 | Embodiment 12 | Embodiment 13 | Comparative Example 1 | Comparative Example 2 |
|---|---|---|---|---|---|---|
| Content of element titanium, ppm | 32.1 | 40.2 | 150 | 200 | 20 | 180 |
| Content of element phosphorus, ppm | 53.5 | 59.8 | 22 | 20 | 50 | 12 |
| Weight ratio of element titanium to element phosphorus | 0.6 | 0.67 | 6.82 | 10 | 0.4 | 15 |
| Melt flow index, g/10 min | 5.5 | 5.8 | 8.2 | 9.5 | 5.5 | 5.5 |
| Melt flow index after water bath treatment, g/10 min | 50.8 | 47.0 | 45.9 | 57.8 | 69.5 | 74.9 |
| Change of the melt flow index, g/10 min | 45.3 | 41.2 | 37.7 | 48.3 | 64 | 69.4 |

TABLE 2

Ratios of each component and property test results of Embodiments 1-13 and Comparative Example 1-2

| | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|
| Content of element titanium, ppm | 50.5 | 20 | 30 | 35 | 69.5 | 90 | 120 | 80 | 100 |
| Content of element phosphorus, ppm | 40.4 | 15 | 20 | 50 | 59.4 | 55 | 70 | 35 | 25 |
| Weight ratio of element titanium to element phosphorus | 1.25 | 1.33 | 1.5 | 0.7 | 1.17 | 1.64 | 1.7 | 2.28 | 4.0 |
| Melt flow index, g/10 min | 5.1 | 5.5 | 3 | 5.5 | 4.0 | 10 | 9.0 | 3.4 | 7.8 |
| Melt flow index after water bath treatment, g/10 min | 25.2 | 22.8 | 22.2 | 33.6 | 27.4 | 33 | 35.7 | 37.9 | 40.8 |
| Change of the melt flow index, g/10 min | 20.1 | 17.3 | 19.2 | 28.1 | 23.4 | 23 | 26.7 | 34.5 | 33 |

The PBS resin compositions of the present invention were treated in a 95° C.-distilled water bath for 12 hours and dried at 90° C. for 3 hours, and the melt flow index thereof changed. The smaller the change, the better the hydrolysis property of the PBS resin composition proved. It can be seen from Table 2 that the weight ratio of the element titanium to the element phosphorus in the PBS resin composition is 0.6-10:1, and a change of the melt flow index after the 95° C.-distilled water bath for 12 hours and drying at 90° C. for 3 hours is less than 50.0 g/10 min which indicates that the PBS resin composition has good hydrolysis property. While the weight ratio of the element titanium to the element phosphorus in Comparative Example 1 is less than 0.6 and the weight ratio of the element titanium to the element phosphorus in Comparative Example 2 is greater than 10, the change of the melt flow index is greater than 50.0 g/10 min which indicates a poor hydrolysis property of the composition.

What is claimed is:

1. A PBS resin composition, characterized in that, the PBS resin composition comprises the following components:
   a. a PBS(poly(1,4-butylene succinate)) resin;
   b. an element titanium;
   c. an element phosphorus;
   wherein the range of a weight ratio of the element titanium to the element phosphorus in the PBS resin composition is 1.25-1.5:1.

2. The PBS resin composition according to claim 1, wherein a weight content of the element titanium in the PBS resin composition is 20-200 ppm, and a weight content of the element phosphorus in the PBS resin composition is 15-70 ppm.

3. The PBS resin composition according to claim 1, wherein with reference to the US EPA method 3052:1996 by using ICP-OES for analysis, the weight contents of the element titanium and the element phosphorus in the PBS resin composition are determined according to following procedure: weighing 0.1 g of the PBS resin composition and crushing, then dropping 5 mL of nitric acid to fully immerse the PBS resin composition; then dropping 1.0 mL of hydrogen peroxide to react for 2 minutes, sealing into a microwave digestion tank to digest at 210° C. for 3 hours; and after cooling to room temperature, filtering with a 0.45 μm filter membrane followed by diluting with distilled water to a volume of 50 mL for an ICP-OES test.

4. The PBS resin composition according to claim 1, wherein the PBS resin composition has a melt flow index of 3.0-10.0 g/10 min when tested at 190° C. under a condition of 2.16 kg weight.

5. The PBS resin composition according to claim 1, wherein said element titanium is from a titanium-containing compound, the titanium-containing compound being selected from one of or a mixture of N-butyl titanate and isopropyl titanate.

6. The PBS resin composition according to claim 1, wherein said element phosphorus is from a phosphorus-containing compound, the phosphorus compound being selected from one of or a mixture of triethyl phosphate, trimethyl phosphate, tributyl phosphate and triphenyl phosphate.

7. The PBS resin composition according to claim 1, wherein after treating in a 95° C.-distilled water bath for 12 hours and drying at 90° C. for 3 hours, a change of the melt flow index of the PBS resin composition is less than 50.0 g/10 min.

8. A preparation method of a PBS resin composition, wherein the PBS resin composition comprises the following components:
   a. PBS(poly(1,4-butylene succinate)) resin;
   b. element titanium; and
   c. element phosphorus,
   characterized in that, the preparation method comprises the following steps:
   S1. mixing succinic acid, 1,4-butanediol and a titanium-containing compound, and maintaining at a temperature of 180-250° C. under a pressure of 50-100 kPa for 1-5 hours;
   S2. after aerating $CO_2$, adding a phosphorus-containing compound and maintaining for 10-30 minutes; and
   S3. reducing the pressure to less than 100 Pa, heating a mixture obtained in step 2 to 230-250° C., maintaining for 3-6 hours, aerating nitrogen and pelletizing.

9. A preparation method of the PBS resin composition according to claim 8, wherein a range of a weight ratio of the element titanium to the element phosphorus in the PBS resin composition is 0.6-10:1,
characterized in that, the preparation method comprises the following steps:
   S1. mixing succinic acid, 1,4-butanediol and a titanium-containing compound, and maintaining at a temperature of 180-250° C. under a pressure of 50-100 kPa for 1-5 hours;

S2. after aerating $CO_2$, adding a phosphorus-containing compound and maintaining for 10-30 minutes; and S3. reducing the pressure to less than 100 Pa, heating a mixture obtained in step 2 to 230-250° C., maintaining for 3-6 hours, aerating nitrogen and pelletizing.

10. A preparation method of the PBS resin composition according to claim 8, wherein the range of the weight ratio of the element titanium to the element phosphorus in the PBS (poly(1,4-butylene succinate))resin composition is 0.7-4:1, characterized in that, the preparation method comprises the following steps:

S1. mixing succinic acid, 1,4-butanediol and a titanium-containing compound, and maintaining at a temperature of 180-250° C. under a pressure of 50-100 kPa for 1-5 hours;

S2. after aerating $CO_2$, adding a phosphorus-containing compound and maintaining for 10-30 minutes; and S3. reducing the pressure to less than 100 Pa, heating a mixture obtained in step 2 to 230-250° C., maintaining for 3-6 hours, aerating nitrogen and pelletizing.

11. A preparation method of the PBS resin composition according to claim 8, wherein a weight content of the element titanium in the PBS resin composition is 20-200 ppm, and a weight content of the element phosphorus in the PBS resin composition is 15-70 ppm, characterized in that, the preparation method comprises the following steps:

S1. mixing succinic acid, 1,4-butanediol and a titanium-containing compound, and maintaining at a temperature of 180-250° C. under a pressure of 50-100 kPa for 1-5 hours;

S2. after aerating $CO_2$, adding a phosphorus-containing compound and maintaining for 10-30 minutes; and S3. reducing the pressure to less than 100 Pa, heating a mixture obtained in step 2 to 230-250° C., maintaining for 3-6 hours, aerating nitrogen and pelletizing.

12. A preparation method of the PBS resin composition according to claim 8, wherein with reference to the US EPA method 3052:1996 by using ICP-OES for analysis, the weight contents of the element titanium and the element phosphorus in the PBS resin composition are determined according to following procedure: weighing 0.1 g of the PBS resin composition and crushing, then dropping 5 mL of nitric acid to fully immerse the PBS resin composition; then dropping 1.0 mL of hydrogen peroxide to react for 2 minutes, sealing into a microwave digestion tank to digest at 210° C. for 3 hours; and after cooling to room temperature, filtering with a 0.45 μm filter membrane followed by diluting with distilled water to a volume of 50 mL for an ICP-OES test, characterized in that, the preparation method comprises the following steps:

S1. mixing succinic acid, 1,4-butanediol and a titanium-containing compound, and maintaining at a temperature of 180-250° C. under a pressure of 50-100 kPa for 1-5 hours;

S2. after aerating $CO_2$, adding a phosphorus-containing compound and maintaining for 10-30 minutes; and S3. reducing the pressure to less than 100 Pa, heating a mixture obtained in step 2 to 230-250° C., maintaining for 3-6 hours, aerating nitrogen and pelletizing.

13. A preparation method of the PBS resin composition according to claim 8, wherein the PBS resin composition has a melt flow index of 3.0-10.0 g/10 min when tested at 190° C. under a condition of 2.16 kg weight for an improved hydrolysis property, characterized in that, the preparation method comprises the following steps:

S1. mixing succinic acid, 1,4-butanediol and a titanium-containing compound, and maintaining at a temperature of 180-250° C. under a pressure of 50-100 kPa for 1-5 hours;

S2. after aerating $CO_2$, adding a phosphorus-containing compound and maintaining for 10-30 minutes; and S3. reducing the pressure to less than 100 Pa, heating a mixture obtained in step 2 to 230-250° C., maintaining for 3-6 hours, aerating nitrogen and pelletizing.

14. A preparation method of the PBS resin composition according to claim 8, wherein said element titanium is from a titanium-containing compound, the titanium-containing compound being selected from one of or a mixture of n-butyl titanate and isopropyl titanate, characterized in that, the preparation method comprises the following steps:

S1. mixing succinic acid, 1,4-butanediol and a titanium-containing compound, and maintaining at a temperature of 180-250° C. under a pressure of 50-100 kPa for 1-5 hours;

S2. after aerating $CO_2$, adding a phosphorus-containing compound and maintaining for 10-30 minutes; and S3. reducing the pressure to less than 100 Pa, heating a mixture obtained in step 2 to 230-250° C., maintaining for 3-6 hours, aerating nitrogen and pelletizing.

15. A preparation method of the PBS resin composition according to claim 8, wherein said element phosphorus is from a phosphorus-containing compound, the phosphorus compound being selected from one of or a mixture of more of triethyl phosphate, trimethyl phosphate, tributyl phosphate and triphenyl phosphate, characterized in that, the preparation method comprises the following steps:

S1. mixing succinic acid, 1,4-butanediol and a titanium-containing compound, and maintaining at a temperature of 180-250° C. under a pressure of 50-100 kPa for 1-5 hours;

S2. after aerating $CO_2$, adding a phosphorus-containing compound and maintaining for 10-30 minutes; and S3. reducing the pressure to less than 100 Pa, heating a mixture obtained in step 2 to 230-250° C., maintaining for 3-6 hours, aerating nitrogen and pelletizing.

\* \* \* \* \*